(12) United States Patent
Rauer et al.

(10) Patent No.: US 8,321,155 B2
(45) Date of Patent: *Nov. 27, 2012

(54) FIELD DEVICE COMPRISING TWO PROCESSORS

(75) Inventors: Winfried Rauer, Fischerbach (DE); Martin Gaiser, Alpirsbach (DE); Manfred Kopp, Wolfach (DE); Ralf Schaetzle, Fischerbach (DE)

(73) Assignee: VEGA Grieshaber KG, Wolfach (DE)

( * ) Notice: Subject to any disclaimer, the term of this patent is extended or adjusted under 35 U.S.C. 154(b) by 328 days.

This patent is subject to a terminal disclaimer.

(21) Appl. No.: 12/725,860

(22) Filed: Mar. 17, 2010

(65) Prior Publication Data

US 2010/0256921 A1 Oct. 7, 2010

Related U.S. Application Data

(60) Provisional application No. 61/165,703, filed on Apr. 1, 2009.

(30) Foreign Application Priority Data

Apr. 1, 2009 (EP) .................................. 09157117

(51) Int. Cl.
G06F 19/00 (2011.01)
(52) U.S. Cl. ........................................ 702/23
(58) Field of Classification Search .................. 702/23
See application file for complete search history.

(56) References Cited

U.S. PATENT DOCUMENTS 5,534,849 A 7/1996 McDonald et al.
7,018,800 B2 3/2006 Huisenga et al.
7,280,048 B2 10/2007 Longsdorf et al.
2004/0128098 A1 7/2004 Neuhaus et al.

FOREIGN PATENT DOCUMENTS

| CN | 1489722 | 4/2004 |
| CN | 1809730 | 7/2006 |
| CN | 101271012 | 9/2008 |
| DE | 44 07 369 | 9/1995 |
| DE | 10 2006 006 572 | 8/2007 |
| WO | 2004 / 017025 | 2/2004 |
| WO | 2004 / 104525 | 12/2004 |
| WO | 2005 / 064424 | 7/2005 |

OTHER PUBLICATIONS

Safety Integrated for Process Automation, Siemens AG Technical Brochure • Apr. 2008, p. 1-40.*
Pattabiraman et al., "Software Critical Memory: All Memory is Not Created Equal", MicroSoft Research, MicroSoft Corp., MSR-TR-2006-128, XP002525828, Sep. 2006, 12 sheets.

* cited by examiner

Primary Examiner — Tung S Lau
(74) Attorney, Agent, or Firm — Fay Kaplun & Marcin, LLP (57) ABSTRACT

A field device for measuring the filling level, the pressure or the density of a medium in a container is described. The field device comprises two processors that are separate from each other. The first processor corresponds to a lower safety standard while the second processor corresponds to a higher safety standard. Functions of the field device that are directed towards safety are carried out in the second processor. Functions that are less critical to safety are carried out in the first processor. Data exchange between the two processors is controlled by way of an operating system.

14 Claims, 5 Drawing Sheets

FIELD DEVICE COMPRISING TWO PROCESSORS

REFERENCE TO RELATED APPLICATIONS

This application claims the benefit of the filing date of EP Patent Application Serial No. EP 09 157 117.4 filed 1 Apr. 2009, the disclosure of which is hereby incorporated herein by reference and U.S. Provisional Patent Application Ser. No. 61/165,703 filed 1 Apr. 2009 the disclosure of which is hereby incorporated by reference.

FIELD OF THE INVENTION

The present invention relates to filling level measuring, pressure measuring and density measuring. In particular, the invention relates to an electronics unit, for example for a field device for measuring the filling level, the pressure or the density of a medium in a container or for an evaluation device; to a method for measuring and determining the filling level, the pressure or the density of a medium in a container; to a program element and to a computer-readable medium.

BACKGROUND TO THE INVENTION

Developments relating to "functional safety" in the region of filling level measuring, pressure measuring and/or density measuring often require a great deal of effort of time and qualifications of a development team.

Measuring devices or evaluation devices that carry out a safety function, as a rule, may have additional functions that do not contribute to the implementation of the safety function. As a rule, functions that are not oriented to safety may need to be assessed from the point of view of any reactions they may have on the safety function.

This may result in these functionalities, too, usually having to be regarded as critical, which may result in increased development expenditure.

SUMMARY OF THE INVENTION

The present invention relates to an electronics unit for filling level measuring, pressure measuring or density measuring that meets relatively high safety requirements.

Stated are an electronics unit for filling level measuring, pressure measuring or density measuring of a medium in a container, in particular for a measuring device or an evaluation device; a method for measuring and determining the filling level, the pressure and/or the density of a medium in a container; a program element and a computer-readable medium.

The described exemplary embodiments relate equally to the electronics unit, the method, the program element and the computer-readable medium. In other words, the characteristics mentioned below in relation to the electronics unit can also be implemented in the method, the program element or the computer-readable medium, and vice versa.

According to an exemplary embodiment of the invention, an (for example modular) electronics unit for filling level measuring, pressure measuring or density measuring of a medium in a container is stated, with the electronics unit comprising a first processor and a second processor, wherein the electronics unit is designed to carry out functions (for example by executing corresponding program modules) that are critical to safety and functions (for example by executing other program modules) that are not critical to safety, and wherein the first processor is designed to carry out only the functions that are not critical to safety, while the second processor is designed to carry out the functions that are critical to safety. In other words, the second processor may be adapted for meeting a higher safety requirement than the first processor.

In this way the separation of functions of the electronics unit that are critical to safety from functions of the electronics unit that are not critical to safety (for example diagnosis, data logger, statistics, measured value display) may be achieved.

Due to the separation of the two processors, and thus the various functions that are carried out in the electronics unit, the functions that are not critical to safety or that are not directed towards safety can be developed with less expenditure than is the case with the remaining functions. It may thus be possible to use software components or hardware components that are already at hand or that are bought, which components do not have to meet more stringent requirements relating to safety integrity.

The question as to whether or not a program module or a function (which is subsequently executed on one of the processors) is to be considered critical to safety or not critical to safety depends on the level of safety requirements which this function needs to meet. This level of safety requirements, also referred to as the safety integrity level (SIL) is a term from the field of functional safety. The aimed-at safety integrity level dictates the safety-relevant construction principle that is to be met for the risk of malfunction to satisfy the requirements that are to be met.

If a function is classified as being critical to safety, this means, for example, that this function needs to meet the requirements of SIL3 or even SIL4 or SIL2. If a function is not classified as being critical to safety or only to a minor extent critical to safety, this means, for example, that it needs to meet the requirements of SIL0 or SIL1.

Any reference in this document to the second processor for carrying out functions or program modules that are critical to safety of the electronics unit, while the first processor is designed to carry out exclusively functions or program modules that are not critical to safety, refers to the second processor satisfying more stringent safety requirements than the first processor. For example, the second processor meets the safety requirements SIL3 or SIL4, or in particular embodiments only SIL2, whereas the first processor only meets the standard SIL0 or SIL1.

According to a further exemplary embodiment of the invention, the electronics unit is designed for operation also without the second processor. In particular, the electronics unit may be of a modular design so that it can easily be assembled for a particular use.

According to a further exemplary embodiment of the invention, the first processor and the second processor are designed for mutual data exchange.

In other words the functions that are directed towards safety can be carried out on the second processor. If the first processor requires particular data from the second processor, the second processor can transfer this data to the first processor (and vice versa). However, this data exchange is monitored by a control program so that a type of "firewall" is established between the two processes carried out by the two processors, respectively, in order to prevent unintended data exchange.

According to a further exemplary embodiment of the invention, furthermore a real-time operating system is provided that meets the safety requirements of the electronics unit and that is designed to control the data exchange between the two processors.

Such an operating system can be installed centrally. It may also be possible in each case for one operating system to be installed on one of the processors.

According to a further exemplary embodiment of the invention, the two processors are separated from each other in such a way that data in a storage device of the second processor is independent of data in a storage device of the first processor.

The stored bodies of data are thus separate from each other. If data exchange is required, such data exchange is coordinated by the operating system.

According to a further exemplary embodiment of the invention, the functions that are critical to safety are, for example, the measured value determination based on sensor measuring data, which the measuring sensor of the electronics unit has picked up. Likewise, it may be the derivation of further measured values based on already determined measured values and/or the output of measured values and/or the diagnosis of particular functions of the electronics unit or of the field device.

According to a further exemplary embodiment of the invention, the functions that are not critical to safety are, for example, the establishment of a connection between the field device and an external communication unit; the recording of measured values with corresponding status information relating to the time; the measured value display; and/or a value setting in the field device.

According to a further exemplary embodiment of the invention, the field device is designed as a filling level radar. In this arrangement, communication with the external communication unit takes place on the basis of a Profibus standard or of a Foundation Fieldbus standard. In this arrangement, the second processor is designed to implement layers of communication that are critical to safety, while the first processor is designed to implement layers of communication that are not critical to safety.

According to a further exemplary embodiment of the invention, the second processor comprises a data storage device for storing program modules, wherein the data storage device is divided into at least one first and one second storage region, which storage regions are separate from each other. The first storage region stores those program modules that are required for safe operation of the electronics unit or the field device, and are thus classified as being critical to safety, while the second storage region stores the data that is provided for transmission to the first processor.

According to a further exemplary embodiment of the invention, the two storage regions form part of a storage-device management unit, which is, for example, a memory management unit (MMU). The storage-device management unit is used for separation of the program modules and data that are/is stored on the various storage regions. The storage-device management unit can be an additional external component to a microprocessor. Furthermore, it can be integrated in the microprocessor. The storage-device management unit controls in particular also storage-device protection tasks. For example, individual storage regions may be blocked to prevent execution by defined program modules or to prevent further writing.

According to a further exemplary embodiment of the invention, separation of the two storage regions is implemented in such a way that no value stored in the first storage device can unintentionally be altered, so that data stored in the first storage device is stored independently of data that is stored in the second storage device.

According to an exemplary embodiment of the invention, the field device is a filling-level measuring device that uses radar signals, guided microwave signals, ultrasound signals or capacitive signals or that is based on a radiometric measuring principle. The field device can also be designed as a limit-level measuring device.

According to a further exemplary embodiment of the invention, the electronics unit forms part of an evaluation device or of a display and operating device.

According to a further exemplary embodiment of the invention, a method for measuring and determining the filling level, the pressure and/or the density of a medium in a container by means of a field device is stated, in which method functions of the field device that are critical to safety are carried out by a second processor, and in which method only functions of the field device that are not critical to safety are carried out by a first processor.

According to a further exemplary embodiment of the invention, a program element for measuring and determining the filling level, the pressure and/or the density of a medium in a container by means of a field device is stated, which program element when executed on two processors of the field device instructs the two processors to carry out the method-related steps stated above.

In this arrangement the program element can, for example, form part of software that is stored on a processor of the electronics unit or of the field device. In this arrangement the processor can also form part of the invention. Furthermore, this exemplary embodiment of the invention comprises a program element that from the very outset uses the invention, or a program element that as a result of an update causes an existing program to use the invention.

According to a further exemplary embodiment of the invention, a computer-readable medium is stated on which a program element for measuring and determining the filling level, the pressure and/or the density of a medium in a container by means of a field device is stored, which program element when executed on two processors of the field device instructs the two processors to carry out the method-related steps stated above.

Below, exemplary embodiments of the invention are described with reference to the figures.

DETAILED DESCRIPTION

The illustrations in the figures are diagrammatic and not to scale.

In the following description of the figures the same reference characters are used for identical or similar elements.

Figure 1A:
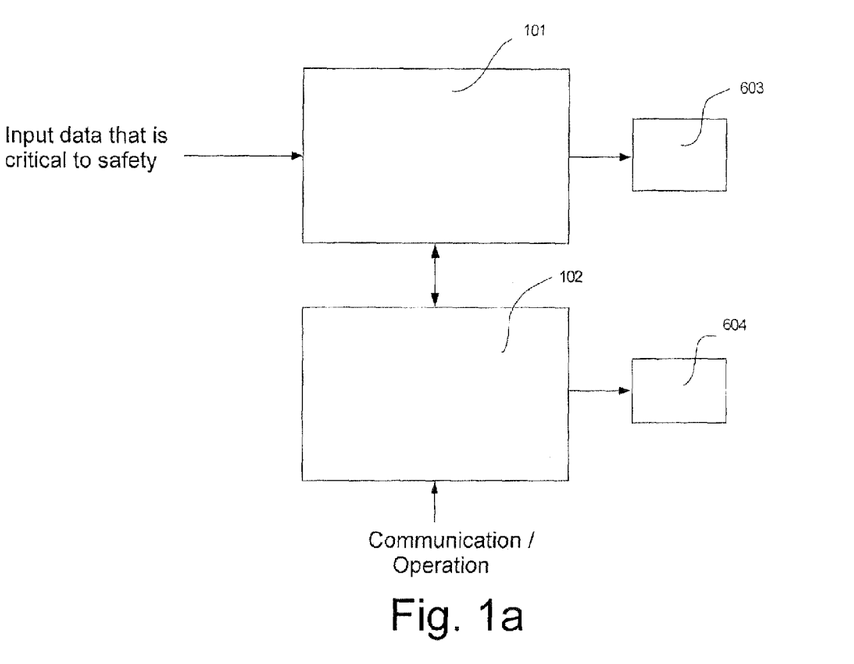
FIG. 1a shows two processors with inputs and outputs according to an exemplary embodiment of the invention.

FIG. 1a shows two processors with inputs and outputs according to an exemplary embodiment of the invention. The first processor 102 is used to carry out functions that are not critical to safety, while the second processor 101 is used to carry out functions that are critical to safety. Both processors can communicate with each other. The first processor 102 receives communication signals or operation signals, while the second processor receives input data that is critical to safety. The first processor comprises non-SIL-outputs 604, while the second processor comprises SIL-outputs 603.

Figure 1B:
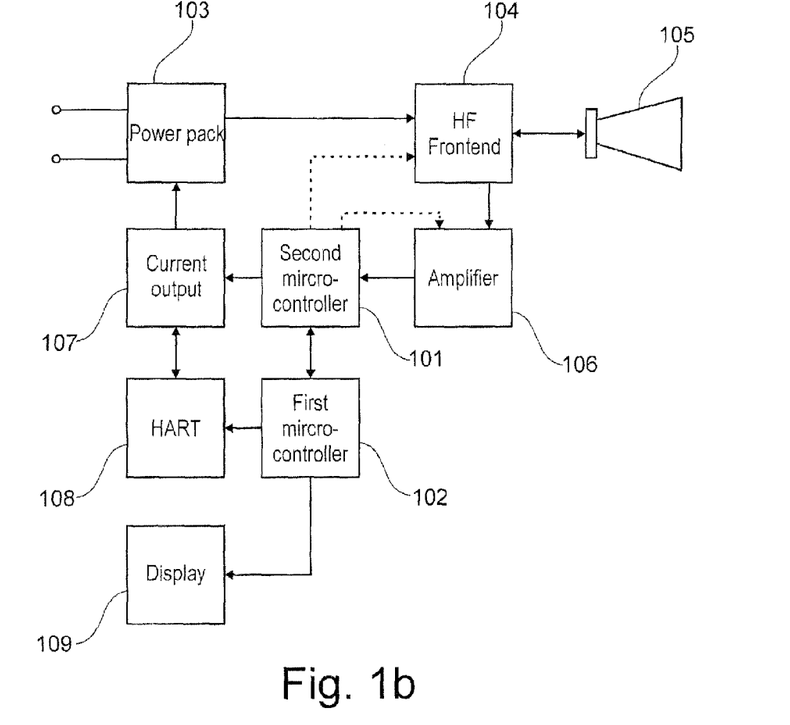
FIG. 1b in an exemplary manner shows electronics for a filling-level radar device according to an exemplary embodiment of the invention.

FIG. 1b in an exemplary manner shows electronics for a filling-level radar device that comprises a second microcontroller or processor 101 and a first microcontroller or processor 102. The electronics modules shown in FIGS. 1 to 3 can be installed in various field devices or evaluation devices, for example in filling-level radar devices. It should be noted that the electronics modules according to the invention with their two processors can also be used for pressure measuring devices or density measuring devices.

The exemplary embodiment of FIG. 1 provides for a power pack 103 which supplies the HF front end 104 with energy. The HF front end 104 is connected to the measuring antenna 105. The measuring signal received by the antenna 105 is conveyed to an amplifier 106 by way of the HF front end 104. The amplifier 106 transmits the amplified receive signal to the second processor 101, which controls measured value output by way of the current output 107. For measured value display the current output 107 is coupled to the power pack 103 and thus for example to a 4 . . . 20 mA two-wire loop.

The measured values can of course also be transferred to external devices by way of other communication protocols, for example wirelessly by way of a wireless connection.

The second processor 101 is connected to the first processor 102 in a communicable (bi-directional) manner, wherein it is ensured that it is impossible to unintentionally transmit data from the first processor to the second processor. The first processor 102 is coupled to a graphic output unit (display) 109 in order to visualise measured data.

Furthermore, the first processor 102 is connected to the HART bus 108, to which it can transfer data. The HART bus 108 is connected to the current output 107 in a communicable (bi-directional) manner.

Furthermore, the second processor 101 can access the HF front end 104 and the amplifier 106, for example in the manner of a control loop.

An inventive measuring device for a process variable is thus constructed so as to comprise at least two processors. It is also possible to provide a greater number of processors. One processor assumes the tasks which are to be allocated to the safety function, e.g. control of the hardware, measuring and outputting the measured value. A further processor 102 carries out the tasks that are not critical to safety, for example operation or communication. Both processors communicate with each other.

Thus the software components and the hardware components that are critical to safety and that are not critical to safety are separated from each other. The components that are not critical to safety cannot impair the safety function. Safety standards need to be applied only to those parts of the device that carry out functions that are critical to safety. This results in a more robust device that can be developed with less effort.

There is thus separation, within the device, between tasks that are critical to safety and tasks that are not critical to safety. It is thus not necessary to develop all the software components and hardware components according to safety standards.

Figure 2:
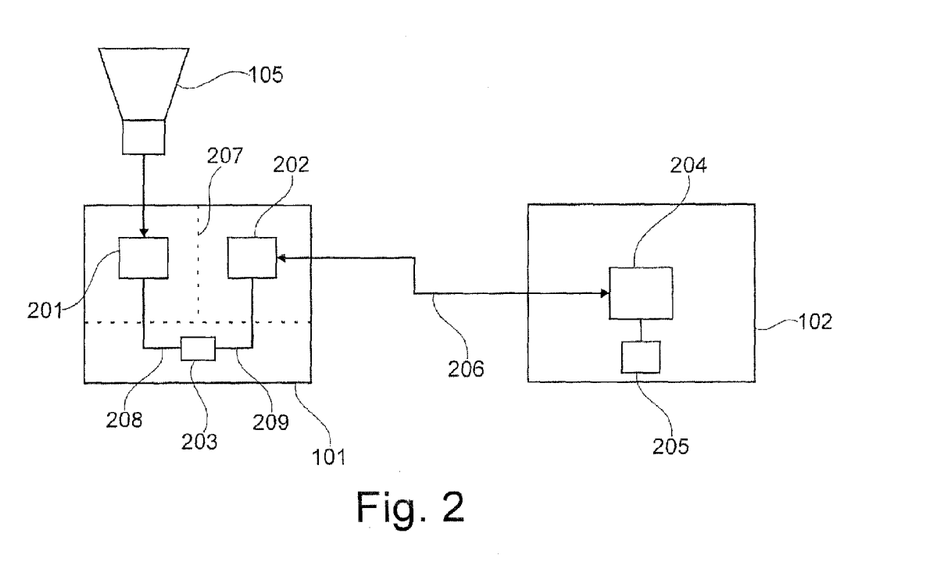
FIG. 2 shows an illustration of electronics for a field device according to a further exemplary embodiment of the invention.

FIG. 2 shows a further exemplary embodiment of an electronic module in which two processors 101, 102 that are separate from each other are also provided.

The one processor, which is the processor 101 that is critical to safety, comprises storage regions 201, 202 that are separate from each other. The dashed line 207 indicates the boundary between the two storage regions.

Furthermore, a real-time operating system 203 is provided, which controls communication between the two separate storage regions 201, 202 (see communication paths 208 and 209).

The first storage region 201 is coupled to the measurement transducer 105 (for example a radar antenna or a pressure sensor) and is supplied with measured values. In this region 201 the program modules run that are critical to safety. If the other processor 102 requires data from the processor 101, this data is transferred from the first storage region 201 to the second storage region 202 by means of the operating system 203, and is subsequently transferred to the storage region 204 of the other processor 102 by way of the communication path 206.

The processor 102 is controlled by way of a separate operating system 205.

Thus, double separation is provided for. Firstly the two processors 101 and 102 are separate from each other, and secondly, furthermore, the storage regions 201, 202 of the processor 101 are separate from each other. In this way safety can be further improved.

Figure 3:
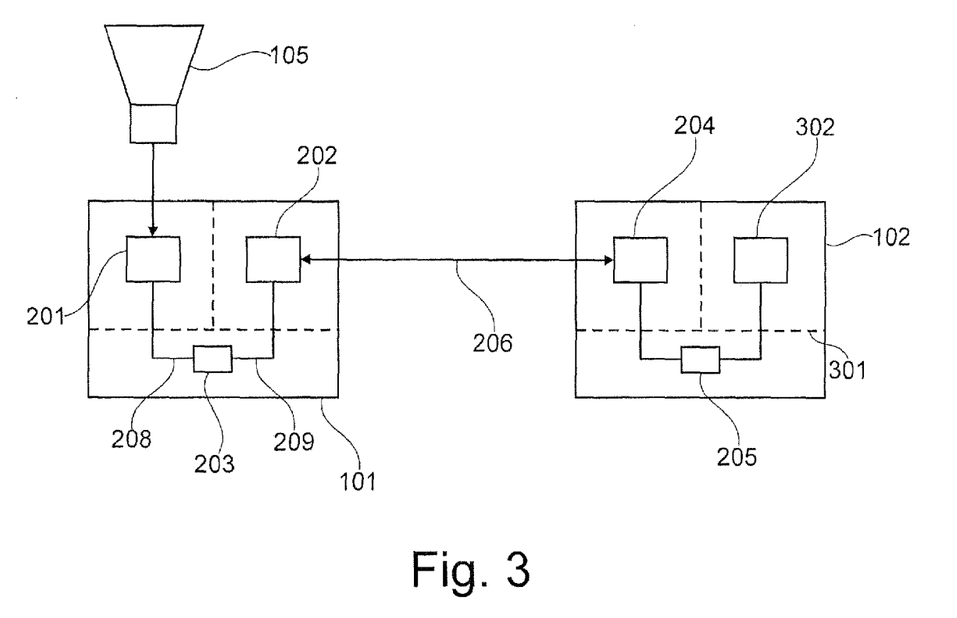
FIG. 3 shows an illustration of electronics for a field device according to a further exemplary embodiment of the invention.

FIG. 3 shows a further exemplary embodiment of an electronics module which also comprises two processors 101, 102. Both processors comprise storage regions 201, 202 and 204, 302 that are separate from each other.

For example, data transfer from the first storage region 201, which comprises particularly good safety features, of the one processor to the second storage region 202 can only take place unidirectionally. It is not possible for data from the second storage region 202 to reach the first storage region 201.

In this way data safety may be still further improved.

Data exchange between the two processors can only take place between the second storage region 202 of the one processor 101 and the first storage region 204 of the other processor 102. The operation system 205 of the processor 102 controls the data exchange between the two storage regions 204, 302 of the processor 102.

In this processor, too, the two storage regions 204, 302 are separate from each other (see dashed line 301).

If the field device is a filling-level measuring device according to the radar principle, the second processor is designed for controlling the HF front end, for controlling the amplifier and for computing the measured values as well as for controlling the current output that corresponds to the measured value. The first processor controls a display and operating module and is responsible for communication. Communication can, for example, take place according to the HART standard.

If the field device is a fieldbus device that communicates by way of the Profibus standard or the Foundation Fieldbus standard, the second processor additionally carries out the safety-critical layer of communication. The first processor carries out the lower layers of communication, which are not critical to safety.

Radiometric filling level sensors or density sensors can be designed in this very manner.

Figure 4:
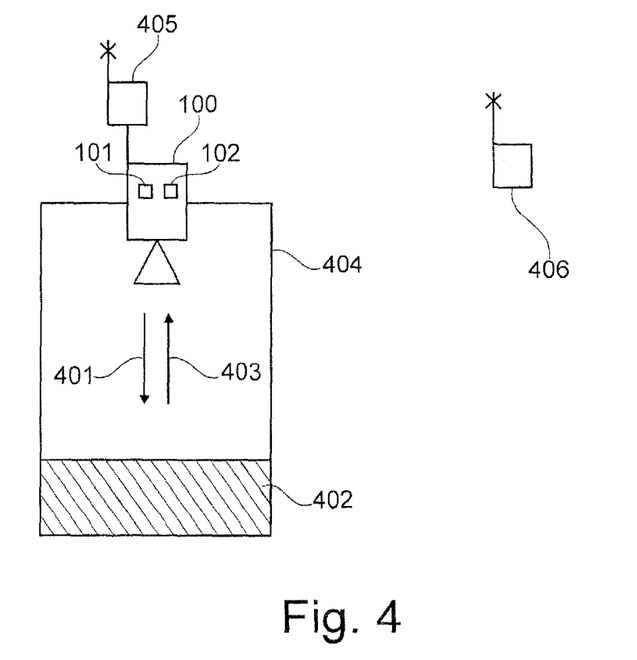
FIG. 4 shows a filling-level measuring device according to a further exemplary embodiment of the invention.

FIG. 4 shows a filling-level measuring device 100 that is installed in a tank 404 and comprises an electronics module with two processors 101, 102 that are separate from each other. The filling-level measuring device 100 transmits a measuring signal 401 in the direction of the surface of the feed material 402. This measuring signal is reflected from the surface of the feed material, and the corresponding receive signal 403 is subsequently picked up by the filling-level measuring device 100 and is evaluated. By way of a communication module 405, communication with an external evaluation unit 406 is possible. Communication with the external evaluation unit can be in a wire-bound or in a wireless manner.

Figure 5:
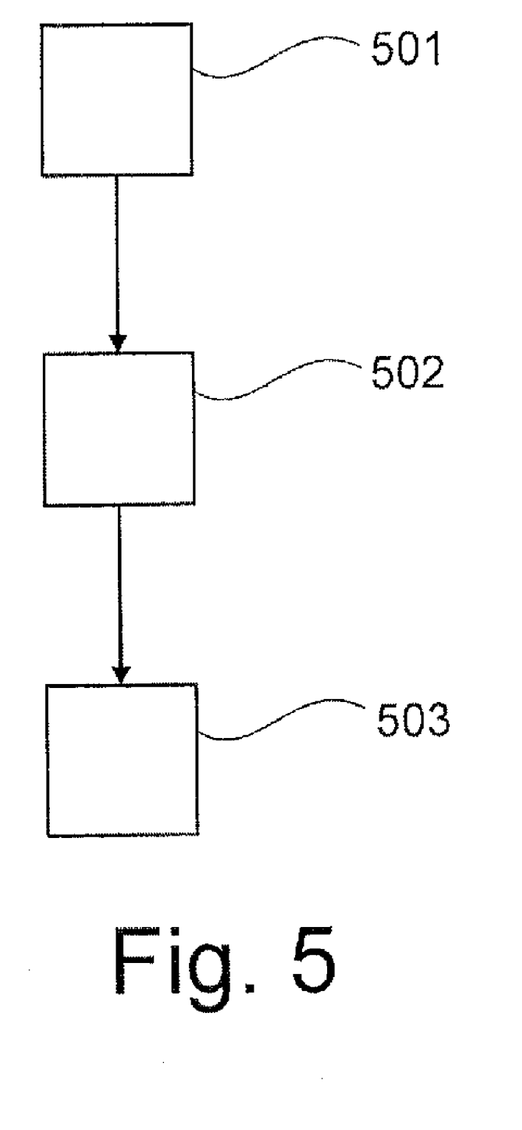
FIG. 5 shows a flow chart of a method according to an exemplary embodiment of the invention.

FIG. 5 shows a flow chart of a method according to an exemplary embodiment of the invention. In step 501 functions of the field device that are critical to safety take place by means of a second processor. In step 502 functions of the field device that are not critical to safety take place by means of a first processor. In step 503, data is exchanged between the two processors. This data exchange is controlled by way of a real-time operating system of the field device.

Figure 6:
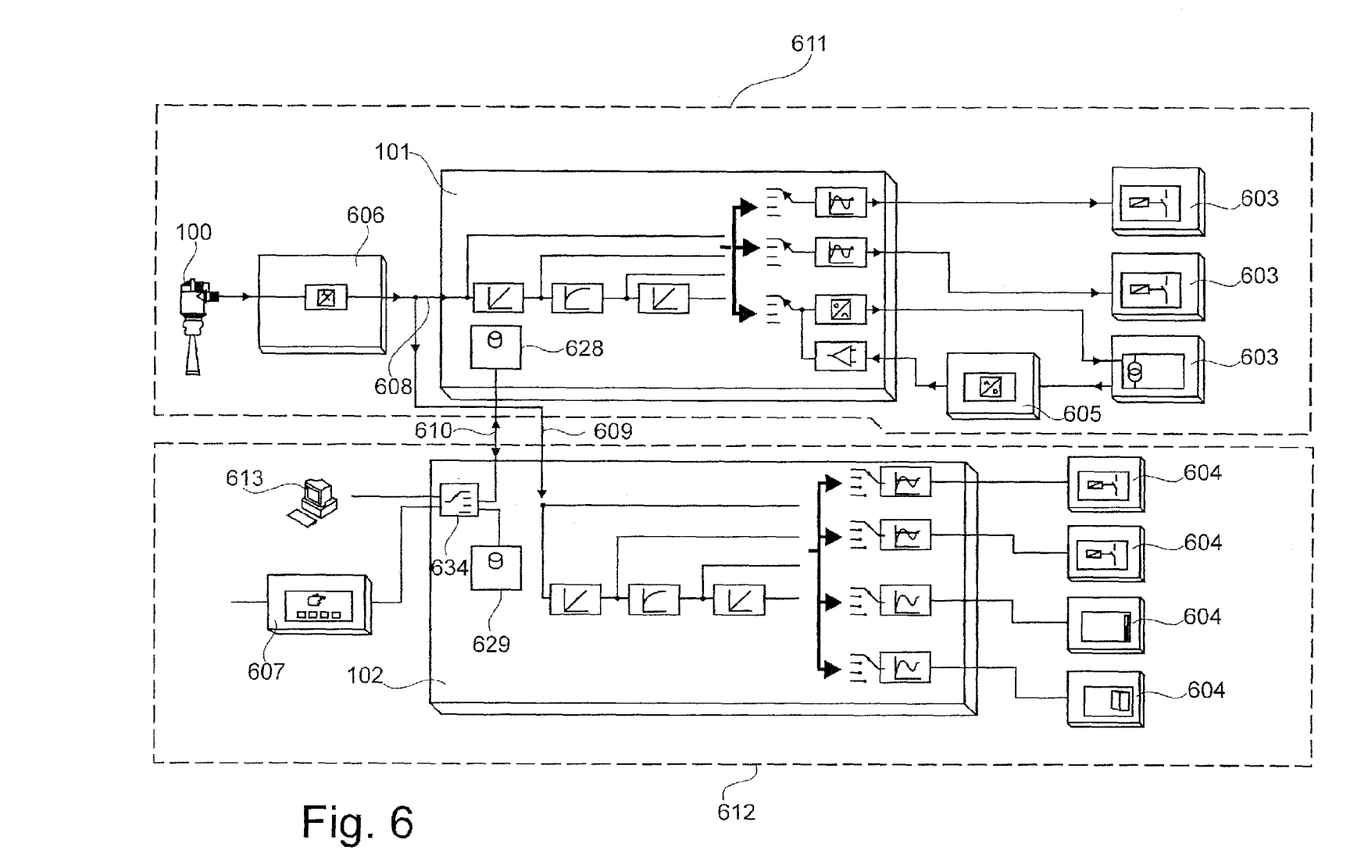
FIG. 6 shows an illustration of electronics for an evaluation device according to an exemplary embodiment of the invention.

FIG. 6 shows a circuit of an evaluation device according to an exemplary embodiment of the invention. The evaluation device is connected to a filling level sensor 100. It can also be connected to a pressure sensor or a density sensor or to a sensor for some other physical quantity.

The evaluation device is characterised by its modular design, which makes possible separation of tasks that are critical to safety from tasks that are not critical to safety.

In particular, the evaluation device comprises two processors 101, 102. The first processor 102 is situated in the path of the evaluation device that is known as not being critical to safety, which path meets a correspondingly low safety standard. The other processor 101 is arranged in the path of the evaluation device, which path is critical to safety, which path meets a more stringent safety standard.

The path that is critical to safety and the path that is not critical to safety are shown by dashed boxes 611, 612.

The electronics module (or the measuring device or the evaluation device) is designed so as to comprise at least two processors 101, 102. One processor 101 assumes the functions that are to be allocated to the safety function, e.g. control of the SIL-outputs, measuring, carrying out required diagnostic measures. The second processor 102 carries out the tasks that are not critical to safety, e.g. operation or communication, and controls the non-SIL-outputs. Both processors 101, 102 communicate with each other. To this effect the communication line 610, for example between the parameter storage device 628 and the separating filter 634, is provided. The parameter storage device 629, too, is connected to the separating filter 634.

Based on the sensor value, provided by the A/D-converter 606, from the sensor 100, the processor 101 carries out calculation of the measured value and correspondingly controls the SIL-outputs 603. SIL-outputs 603 can be relays or current outputs. If it is a current output, diagnosis of said current output requires a further A/D-converter 605 that is switched between the corresponding SIL-output and the processor 101.

The A/D-converter 606 is connected to the processor 101 by way of the line 608. Furthermore, this converter 606 is connected to the other processor 102 by way of the line 609.

Also based on the sensor value provided by the A/D-converter 606, the processor 102, which is arranged in the path 612 that is not critical to safety, carries out calculation of the measured value and in this way controls the non-SIL-outputs 604. Furthermore, the processor 102 is responsible for operating the sensor and for communication (for example between the sensor and a display and operating device). To this effect, corresponding connections are provided, by way of which, for example, a computer 613 (for example by way of a USB-, an RS232- or an Ethernet interface) or a device operating unit 607 can be connected. Communication can take place by way of the PC 613.

Because of the modular design of the evaluation device, in a non-SIL design of the evaluation device it is possible to do without the processor 101 that carries out the safety function, as well as without the A/D-converter 605 and the SIL-outputs 603. In this case all the sensor data is transferred to the processor 102 by way of the communication line 609. As a result of the modular separation between software- and hardware components that are critical to safety and that are not critical to safety, there is only a different hardware assembly for the SIL- and the non-SIL-embodiment of the electronics unit.

Instead of providing one sensor 100 in the path that is critical to safety, it is also possible to connect several sensors in the path that is critical to safety. The sensor values can be processed both by the processor 102 and by the processor 101. Furthermore, an additional connection of sensors only to the processor 102 is possible. These sensors are sensors that are available only for measured value processing in the path that is not critical to safety.

There is thus a separation between software- and hardware components that are critical to safety and that are not critical to safety. Components that are not critical to safety cannot impair the safety functions. Safety standards only need to be applied to those components of the device that are situated in the path that is critical to safety. The result is an evaluation device or generally an electronics unit which as a result of being equipped with a processor can be used in applications that are not critical to safety, while if they are equipped with two or more processors they can also be used in applications that are critical to safety.

Thus in applications that are not critical to safety, the path that is critical to safety can be done without. Nor is there a need to provide a diagnostic circuit in such a path that is critical to safety.

The modular design may make it possible by simple re-equipping or non-equipping without special new firmware to assemble an embodiment for applications that are critical to safety, and to assemble a second, simpler embodiment for applications that are not critical to safety.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An electronics unit for at least one of a filling level measuring, a pressure measuring and a density measuring of a medium in a container, comprising:
   a first processor; and
   a second processor;
   wherein the first processor and the second processor are adapted for executing program modules;
   wherein the unit is designed to carry out only a first program module that is critical to safety with the first processor and a second program modules that is not critical to safety with the second processor;
   wherein the second processor is designed for meeting a higher safety requirement than the first processor.

2. The electronics unit according to claim 1, wherein the unit is designed for operation also without the second processor.

3. The electronics unit according to claim 1, wherein the first processor and the second processor are designed for mutual data exchange.

4. The electronics unit according to claim 3, further comprising:
- a real-time operating system "(RTOS")" meeting safety requirements of the electronics unit, the RTOC being designed to control the data exchange between the first and second processors.

5. The electronics unit according to claim 1, wherein the first and second processors are separated from each other in such a way that data in a storage device of the second processor is independent of data in a storage device of the first processor.

6. The electronics unit according to claim 1, wherein the first program module is selected from a group comprising (a) measured value determination based on sensor measuring data; (b) derivation of further measured values based on already determined measured values; (c) output of measured values; and (d) diagnosis.

7. The electronics unit according to claim 1, wherein the second program module is selected from a group comprising (a) an establishment of a connection to an external communication unit; (b) a recording of measured values with status information relating to the time; (c) a measured value display; and (d) value setting in the field device.

8. The electronics unit according to claim 1, wherein the unit forms part of one of a filling level sensor, a pressure measuring device and a density measuring device.

9. The electronics unit according to claim 8 wherein the unit is adapted for communication with an external communication unit using one of a Profibus standard and a Foundation Fieldbus standard, wherein the second processor implements first layers of communication that are critical to safety, and wherein the first processor implements second layers of communication that are not critical to safety.

10. The electronics unit according to claim 1, wherein the unit forms part of one of an evaluation device and a display and operating device.

11. The electronics unit according to claim 1, wherein the second processor comprises a data storage device for storing program modules, wherein the data storage device is divided into at least one first region and at least one second storage region, the first and second regions being separate from each other, wherein the first region store a first program module which is required for a safe operation of the field device and is classified as being critical to safety, and wherein the second region stores the data that is provided for transmission to the first processor.

12. A method for measuring and determining one of a filling level, a pressure and a density of a medium in a container using a field device, comprising:
- carrying out only a first program module of the field device which is not critical to safety using a first processor; and
- carrying out a second program module of the field device which is critical to safety using a second processor;
- wherein the second processor is designed for meeting a higher safety requirement than the first processor.

13. A program element for measuring and determining one of a filling level, a pressure and a density of a medium in a container using a field device, the program element when executed on first and second processors of the field device instructs the first and second processors to carry out the following steps:
- carrying out only a first program module of the field device which is not critical to safety using the first processor; and
- carrying out a second program module of the field device which is critical to safety using the second processor;
- wherein the second processor is designed for meeting a higher safety requirement than the first processor.

14. A computer-readable medium on which a program element for measuring and determining one of a filling level, a pressure and a density of a medium in a container using a field device is stored, the program element when executed on first and second processors of the field device instructs the first and second processors to carry out the following steps:
- carrying out only a first program module of the field device which is not critical to safety using the first processor; and
- carrying out a second program module of the field device which is critical to safety using a the processor;
- wherein the second processor is designed for meeting a higher safety requirement than the first processor.

* * * * *